No. 877,611. PATENTED JAN. 28, 1908.
T. M. STEVIC.
BUGGY WRENCH.
APPLICATION FILED NOV. 9, 1906.
2 SHEETS—SHEET 1.
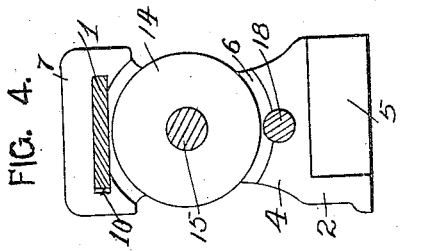
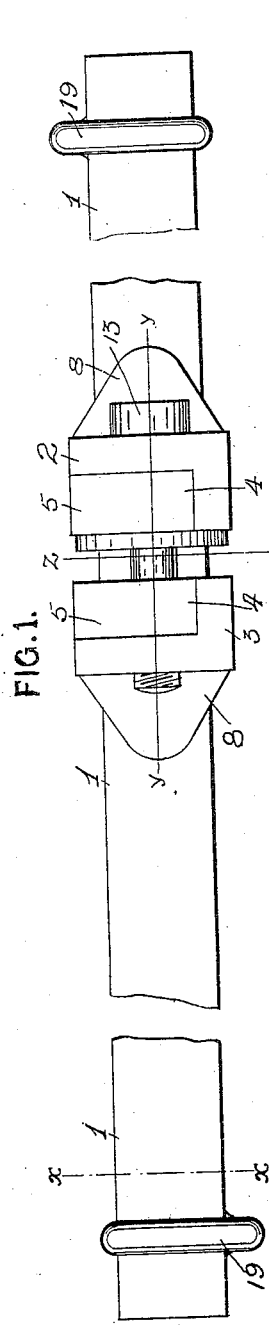
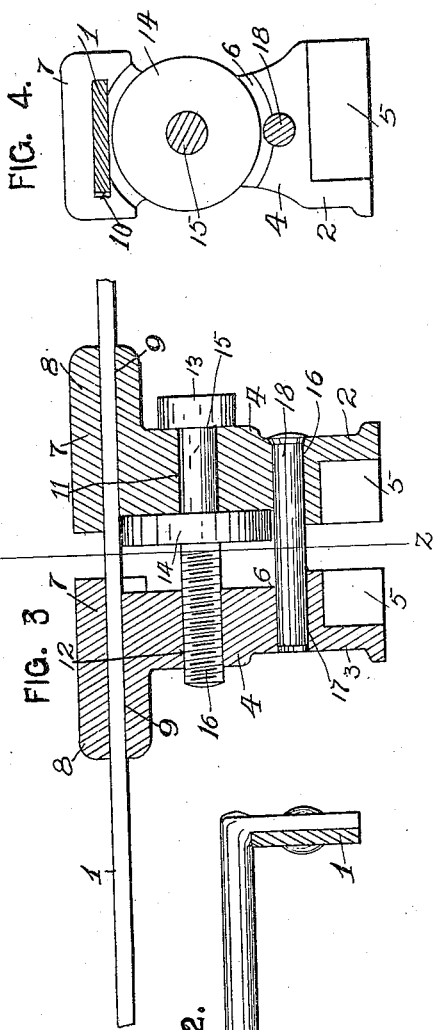
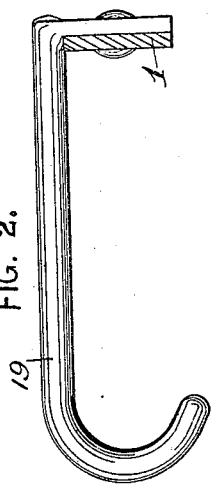
Witnesses.
Inventor.
Thomas M. Stevic No. 877,611.

PATENTED JAN. 28, 1908.

T. M. STEVIC.
BUGGY WRENCH.
APPLICATION FILED NOV. 9, 1906.

2 SHEETS—SHEET 2.

UNITED STATES PATENT OFFICE.

THOMAS MILTON STEVIC, OF WEST TOLEDO, OHIO.

BUGGY-WRENCH.

No. 877,611.    Specification of Letters Patent.    Patented Jan. 28, 1908.

Application filed November 9, 1906. Serial No. 342,760.

*To all whom it may concern:*

Be it known that I, THOMAS MILTON STEVIC, a citizen of the United States, residing at West Toledo, in the county of Lucas and State of Ohio, have invented a useful Improvement on a Buggy-Wrench.

My invention relates to a buggy wrench, and has for its object to provide a simple, convenient, and inexpensive device of the kind, that is adapted to be readily attached to diametric spokes of a vehicle wheel, and engage the axle nut, whereby the nut is removed from or attached to the axle by turning the wheel.

A further object is to provide a device of the kind that is adjustable to engage various sizes of axle nuts.

Figure 5:
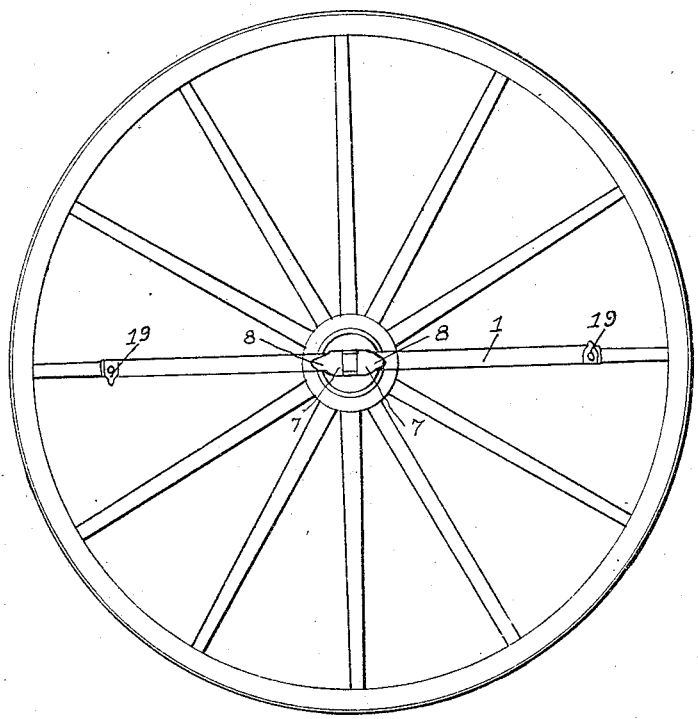
Figure 6:
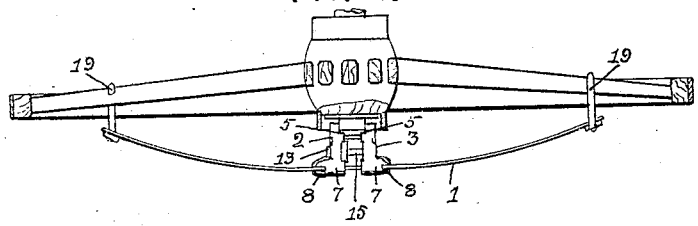

I accomplish these objects by the construction and combination of parts as hereinafter described and illustrated in the drawings, in which Figure 1 is a side view of a wrench constructed in accordance with my invention, the spring body bar being shown broken through. Fig. 2 is a cross section on line x—x of Fig. 1 showing a side view of a spoke hook. Fig. 3 is a longitudinal section of the jaws on line y—y of Fig. 1. Fig. 4 is a cross section on line z—z of Fig. 1. Fig. 5 is a view in side elevation of a wheel having a wrench attached thereto, and Fig. 6 is a top view of the same with the upper half of the rim and spokes cut away.

In the drawings 1 designates the spring body bar, upon which, on one side of the longitudinal center of the bar, is fixedly mounted the jaw 2 and on the other side is movably mounted the jaw 3, the jaws having body portions 4 formed complementary the one to the other, with opposite and complementary angular outer end recesses 5 adapted to receive opposite angle portions of an axle nut, central side recesses 6, and base portions 7, having integral extensions 8, projecting oppositely in a plane at right angles to the body portions of the jaws. Centrally of and in a plane at right angles to the body portions 4, the bases 7 are provided with the rectangular slots 9 through which the spring body bar 1 extends, the jaw 2 being fixed thereon by a key 10.

The jaws 2 and 3 are respectively provided with the axially alined transverse bores 11 and 12, the latter being of slightly reduced diameter and interiorly threaded. In the bore 11 is rotatably journaled and secured to the jaw 2 by the outer integral head 13, and the inner adjusting wheel 14, the clamping bolt 15, having a threaded portion 16 adapted to run into the threaded bore of the jaw 3.

Parallel with the bores 11 and 12 the jaws 2 and 3 are respectively provided with the alined bores 16 and 17, and in the bore 16 is secured one end portion of a pin 18, the opposite end portion of which extends into the bore 17 of the jaw 3 as a guide. The jaw 3 thus connected to the fixed jaw 2, and movably mounted on the spring body bar 1, is adjustable by the wheel 14 of the bolt 15 from close contact with the jaw 2, as required for compressing the jaws on axle nuts of different sizes, extending into the angular recesses of the jaws.

To the outer end portions of the spring bar 1 are secured the spoke hooks 19, which extend from the bar on the same side as the jaws, with the hook portions in parallel planes at right angles to and transverse the planes of the sides of the bar 1, and in reverse position, the one to the other.

Thus constructed, the operation to remove an axle nut is as follows. The axle is raised at one end and supported with the wheel of that end free of the ground. The jaws of the wrench are then adjusted to the axle nut, and compressed thereon by turning the clamping bolt. The wheel is then turned until diametric spokes are in parallel alinement with the spring body bar 1. The end portions of the bar are then sprung inward until the hooks are respectively engaged with the adjacent spokes, and the wheel being then turned in the direction to unscrew the axle nut, the nut will be run off the axle and the wheel may then be removed without detaching the wrench or the nut from the wrench and when the wheel is re-mounted on the axle journal the nut may be again run thereon by revolving the wheel in the opposite direction.

When the spring bar 1 is bent to engage the spoke hooks with the spokes, the guide pin 18 receives any lateral or breaking stress produced thereby, and prevents such stress being received by the adjusting bolt 15, which, by the use of the pin 18, is left free of such stress for the adjustment of the jaw. The pin also holds the jaws in parallel position, and prevents the jaws from being opened wider at their outer ends by the springing of the bar, as would otherwise occur through lost motion between the adjusting bolt and the jaw.

What I claim to be new is—

In a buggy wrench, the combination of a spring body bar, complementary jaws mounted by slotted base portions, one fixedly and the other movably, centrally on the body bar, and provided at their free end portions with complementary angled recesses adapted to receive opposite angled portions of an axle nut, and with complementary alined bolt orifices, between the recesses and the body bar, the orifice of the movable jaw being interiorly threaded, an adjusting bolt connecting the jaws, having a portion rotatably journaled in the bolt orifices of the fixed jaw, and shouldered against longitudinal movement therein, and having a threaded end portion, adapted to run into the complementary alined and interiorly threaded bolt orifice of the movable jaw, a wheel mounted on the bolt to rotate the bolt in the fixed jaw and adjust the movable jaw, a pin fixedly mounted in the fixed jaw parallel with the adjusting bolt, and between the bolt and the angled recesses, and extending through an alined orifice of the movable jaw, and spoke hooks mounted reversely on the end portions of the spring body bar, substantially as set forth.

THOMAS MILTON STEVIC.

Witnesses:
M. E. SAWYER,
ALFRED E. MAYBEE.